United States Patent
Malon et al.

(10) Patent No.: US 12,450,440 B2
(45) Date of Patent: Oct. 21, 2025

(54) EXTRACTING EXPLANATIONS FROM SUPPORTING EVIDENCE

(71) Applicant: NEC Laboratories America, Inc., Princeton, NJ (US)

(72) Inventors: Christopher Malon, Fort Lee, NJ (US); Nitish Joshi, Princeton, NJ (US)

(73) Assignee: NEC Corporation, Tokyo (JP)

( * ) Notice: Subject to any disclaimer, the term of this patent is extended or adjusted under 35 U.S.C. 154(b) by 1286 days.

(21) Appl. No.: 17/116,479

(22) Filed: Dec. 9, 2020

(65) Prior Publication Data

US 2021/0192377 A1 Jun. 24, 2021

Related U.S. Application Data

(60) Provisional application No. 62/949,663, filed on Dec. 18, 2019.

(51) Int. Cl.
| | |
|---|---|
| *G06F 40/30* | (2020.01) |
| *G06F 18/21* | (2023.01) |
| *G06F 18/23213* | (2023.01) |
| *G06N 3/045* | (2023.01) |
| *G06N 5/045* | (2023.01) |

(52) U.S. Cl.
CPC ............ *G06F 40/30* (2020.01); *G06F 18/217* (2023.01); *G06F 18/23213* (2023.01); *G06N 3/045* (2023.01); *G06N 5/045* (2013.01)

(58) Field of Classification Search
CPC ......... G06N 5/045; G06N 3/045; G06F 40/30
See application file for complete search history.

(56) References Cited

U.S. PATENT DOCUMENTS

2019/0318249 A1* 10/2019 Xu ..................... G06N 3/045
2021/0326675 A1* 10/2021 Oh ..................... G06N 3/045

OTHER PUBLICATIONS

Min et al, "Multi-hop Reading Comprehension through Question Decomposition and Rescoring", 2019, arXiv: 1906.02916v2, and pp. 1-13. (Year: 2019).*

(Continued)

*Primary Examiner* — Alexey Shmatov
*Assistant Examiner* — Clint Mullinax
(74) *Attorney, Agent, or Firm* — Joseph Kolodka

(57) ABSTRACT

A method trains an inference model on two-hop NLI problems that include a first and second premise and a hypothesis, and further includes generating, by the model using hypothesis reduction, an explanation from an input premise and an input hypothesis, for an input single hop NLI problem. The learning step determines a distribution over extraction starting positions and lengths from within the first premise and hypothesis of a two-hop NLI problem. The learning step k extraction output slots with combinations of words from the first premise of the two-hop NLI problem and fills another extraction output slots with combinations of words from the hypothesis of the two-hop NLI problem. The learning step trains a sequence model by using the extraction output slots and the other extraction output slots together with the second premise as an input to a single-hop NLI classifier to output a label of the two-hop NLI problem.

19 Claims, 7 Drawing Sheets

(56) References Cited

OTHER PUBLICATIONS

Huang et al, "Relation Module for Non-answerable Prediction on Reading Comprehension", 2019, Proceedings of the 23rd Conference on Computational Natural Language Learning, pp. 747-756. (Year: 2019).*

Seonhoon Kim et al, "Semantic Sentence Matching with Densely-connected Recurrent and Co-attentive Information", arXiv:1805.11360v2 [cs.CL], Nov. 2, 2018, pp. 1-11.

Xiaodong Liu et al, "Multi-Task Deep Neural Networks for Natural Language Understanding", reparXiv: 1901.11504v2 [cs.CL], May 30, 2019, pp. 1-10.

Oana-Maria Camburu et al, "e-SNLI: Natural Language Inference with Natural Language Explanations", 32nd Conference on Neural Information Processing Systems, Dec. 2018, pp. 1-11.

Marco Tulio Ribeiro et al, "Why Should I Trust You? Explaining the Predictions of Any Classifier", http://dx.doi.org/10.1145/2939672.2939778, Feb. 2016, pp. 1135-1144.

Marco Tulio Ribeiro et al, "Anchors: High-Precision Model-Agnostic Explanations", Association for the Advancement of Artificial Intelligence, Apr. 2018, pp. 1-9.

Zhilin Yang et al, "HOTPOTQA: A Dataset for Diverse, Explainable Multi-hop Question Answering", Proceedings of the 2018 Conference on Empirical Methods in Natural Language Processing, Oct. 2018, pp. 2369-2380.

James Thorne et al, "FEVER: a large-scale dataset for Fact Extraction and VERification", Proceedings of NAACL-HLT, Jun. 2018, pp. 809-819.

Adina Williams et al, "A Broad-Coverage Challenge Corpus for Sentence Understanding through Inference", Proceedings of NAACL-HLT, Jun. 2018, pp. 1112-1122.

James Throne et al, "Generating Token-Level Explanations for Natural Language Inference", Proceedings of NAACL-HLT, Jun. 2019, pp. 963-969.

Jacon Devlin et al, "BERT: Pre-training of Deep Bidirectional Transformers for Language Understanding", Proceedings of NAACL-HLT, Jun. 2019, pp. 4171-4186.

Samuel R. Bowman et al, "A large annotated corpus for learning natural language inference", http://aclweb.org/aclwiki/index.php?title=Textual_Entailment_Resource_Pool, Aug. 2015, pp. 1-11.

* cited by examiner

| | |
|---|---|
| Hypothesis | 20 June 1982 \| When was the English rapper, singer and songwriter who sang "later" born? |
| Premise 1 | 1 [Example (musician)] Elliot John Gleave (born 20 June 1982), better known by his stage name Example, is an English rapper, singer, songwriter and record producer signed to Epic Records and Sony Music. |
| Premise 2 | [Later (song)] "Later" is a song by British recording artist Example. |

EXTRACTING EXPLANATIONS FROM SUPPORTING EVIDENCE

RELATED APPLICATION INFORMATION

This application claims priority to U.S. Provisional Patent Application Ser. No. 62/949,663, filed on Dec. 18, 2019, incorporated herein by reference in its entirety.

BACKGROUND

Technical Field

The present invention relates to natural language processing and more particularly to extracting explanations from supporting evidence.

Description of the Related Art

The task of Natural Language Inference (NLI) is an important problem in NLP, concerned with finding the inferential relationship (i.e. entailment, contradiction or neutral) between a premise p and a hypothesis h.

Simple entailment models try to judge hypotheses as true, false, or unsupported based on information in a single sentence or group of concatenated sentences, but this information is sometimes insufficient. In fact-checking applications, a statement may indeed support a claim, yet background information must be verified to confirm this. Instead of an output of "unsupported" whenever the information is insufficient, these applications require a follow-up hypothesis to be generated, which could then be verified in a second hop.

SUMMARY

According to aspects of the present invention, a computer-implemented method is provided for extracting explanations. The method includes learning hypothesis reduction by training an inference model on two-hop Natural Language Inference (NLI) problems that include a first premise, a second premise, and a hypothesis. The method further includes generating, by the trained inference model using hypothesis reduction, an explanation in the form of a selection of words from an input premise and an input hypothesis, for an input single hop NLI problem that includes the input premise and the input hypothesis. The learning step includes determining, using a sequence model, a distribution over extraction starting positions and extraction lengths from within the first premise and the hypothesis of a two-hop NLI problem from among the two-hop NLI problems. The learning step further includes filling, responsive to the distribution, k extraction output slots with combinations of words from the first premise of the two-hop NLI problem. The learning step also includes filling, responsive to the distribution, another k extraction output slots with combinations of words from the hypothesis of the two-hop NLI problem. The learning step additionally includes training the sequence model by using the k extraction output slots and the other k extraction output slots together with the second premise as an input to a single-hop NLI classifier to output a label of the two-hop NLI problem.

According to other aspects of the present invention, a computer program product is provided for extracting explanations. The computer program product includes a non-transitory computer readable storage medium having program instructions embodied therewith. The program instructions are executable by a computer to cause the computer to perform a method. The method includes learning hypothesis reduction by training an inference model on two-hop Natural Language Inference (NLI) problems that include a first premise, a second premise, and a hypothesis. The method further includes generating, by the trained inference model using hypothesis reduction, an explanation in the form of a selection of words from an input premise and an input hypothesis, for an input single hop NLI problem that includes the input premise and the input hypothesis. The learning step includes determining, using a sequence model, a distribution over extraction starting positions and extraction lengths from within the first premise and the hypothesis of a two-hop NLI problem from among the two-hop NLI problems. The learning step further includes filling, responsive to the distribution, k extraction output slots with combinations of words from the first premise of the two-hop NLI problem. The learning step also includes filling, responsive to the distribution, another k extraction output slots with combinations of words from the hypothesis of the two-hop NLI problem. The learning step additionally includes training the sequence model by using the k extraction output slots and the other k extraction output slots together with the second premise as an input to a single-hop NLI classifier to output a label of the two-hop NLI problem.

According to yet other aspects of the present invention, a computer processing system is provided for extracting explanations. The computer processing system includes a memory device for storing program code. The computer processing step further includes a processor device, operatively coupled to the memory device, for running the program code to learn hypothesis reduction by training an inference model on two-hop Natural Language Inference (NLI) problems that include a first premise, a second premise, and a hypothesis. The processor device further runs the program code to generate, by the trained inference model using hypothesis reduction, an explanation in the form of a selection of words from an input premise and an input hypothesis, for an input single hop NLI problem that includes the input premise and the input hypothesis. The processor device learns the hypothesis reduction by determining, using a sequence model, a distribution over extraction starting positions and extraction lengths from within the first premise and the hypothesis of a two-hop NLI problem from among the two-hop NLI problems. The processor device further learns the hypothesis reduction by filling, responsive to the distribution, k extraction output slots with combinations of words from the first premise of the two-hop NLI problem. The processor device also learns the hypothesis reduction by filling, responsive to the distribution, another k extraction output slots with combinations of words from the hypothesis of the two-hop NLI problem. The processor device additionally learns the hypothesis reduction by training the sequence model by using the k extraction output slots and the other k extraction output slots together with the second premise as an input to a single-hop NLI classifier to output a label of the two-hop NLI problem.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a block diagram showing an exemplary transformed dataset, in accordance with an embodiment of the present invention;

DETAILED DESCRIPTION OF PREFERRED EMBODIMENTS

Embodiments of the present invention are directed to extracting explanations from supporting evidence.

One or more embodiments of the present invention are developed by training on a harder problem in which there are two premises and one hypothesis as compared to the case of one premise and one hypothesis. In one or more embodiments, an "extraction element" learns to produce multiple weighted sums of the words in one premise and the hypothesis, which are used with the second premise to decide whether the hypothesis is verified. After training, the "extraction element" can be applied in the case where there is one premise and one hypothesis, and important words can be selected by the size of the weights.

Figure 1:
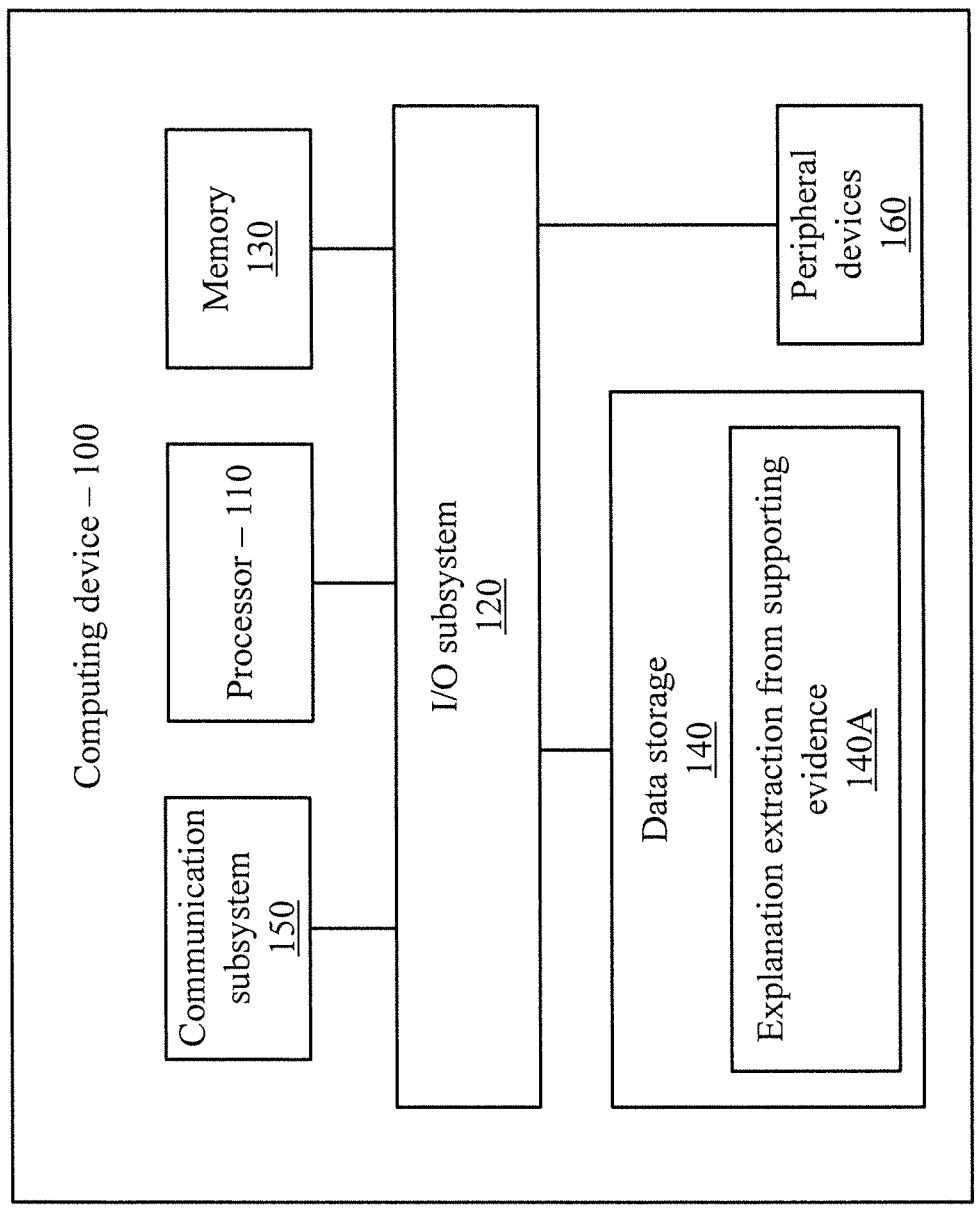
FIG. 1 is a block diagram showing an exemplary computing device, in accordance with an embodiment of the present invention.

The technique can be applied to any Natural Language Inference (NLI) model that accepts a sequence of word embedding vectors for classification, by introducing the extraction element before the NLI model. A hypothesis reduction element itself can be implemented by taking a sequence encoder such as a Transformer network and outputting logits at each token representing the log probability that a span starting at that token and extending for 1, 2, 3, . . . , or k tokens should be extracted into the reduced hypothesis, where k is the maximum length of an extraction. A probability distribution over all such extractions from the premise and another distribution over all possible extractions from the hypothesis are formed using a softmax. A "reduced hypothesis" is formed by calculating the expected hypothesis extraction and the expected premise extraction using these probabilities and the original word vectors. For training, this reduced hypothesis is used with the second premise in the given NLI model. For explanation, the weights of the words in this reduced hypothesis are output FIG. 1 is a block diagram showing an exemplary computing device 100, in accordance with an embodiment of the present invention. The computing device 100 is configured to perform explanation extraction from supporting evidence.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for explanation extraction from supporting evidence. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention FIG. 2 is a block diagram showing an exemplary transformed dataset 200, in accordance with an embodiment of the present invention. In particular, a transformed entailment problem is shown where Premise 1 and Premise 2 are the two evidence sentences provided in the HotpotQA dataset.

The hypothesis is the concatenation of the question and the answer.

First, the multi-hop reading comprehension dataset HotpotQA is transformed and each instance is modeled as an entailment problem. This is done by considering the question and the correct answer together as the hypothesis and the supporting evidence sentences as the premise in the entailment setup. Note that in this example, both the premises are required to verify the hypothesis (without Premise 1 the date cannot be verified, and without Premise 2 the singer of "Later" cannot be verified).

Figure 3:
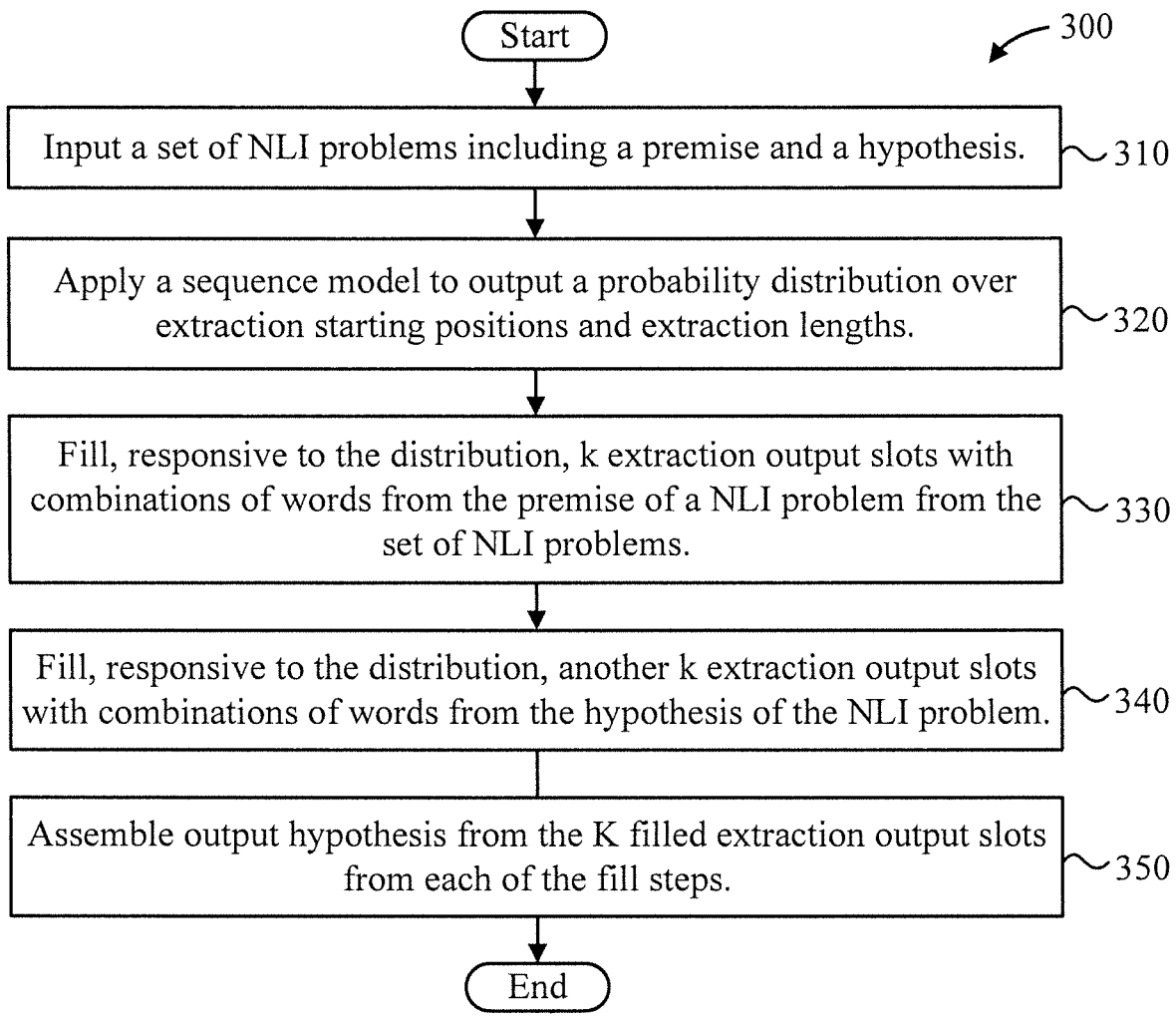
FIG. 3 is a flow diagram showing an exemplary method for hypothesis reduction for Natural Language Inference (NLI), in accordance with an embodiment of the present invention.

FIG. 3 is a flow diagram showing an exemplary method 300 for hypothesis reduction for Natural Language Inference (NLI), in accordance with an embodiment of the present invention.

At block 310, input a set of NLI problems including a premise and a hypothesis.

At block 320, apply a sequence model to output a probability distribution over extraction starting positions and extraction lengths. There is a distribution for the hypothesis and another distribution for the premise.

At block 330, fill, responsive to the distribution, k extraction output slots with combinations of words from the premise of a NLI problem from the set of NLI problems.

At block 340, fill, responsive to the distribution, another k extraction output slots with combinations of words from the hypothesis of the NLI problem.

At block 350, assemble output hypothesis from the K filled extraction output slots from each of the fill steps.

Figure 4:
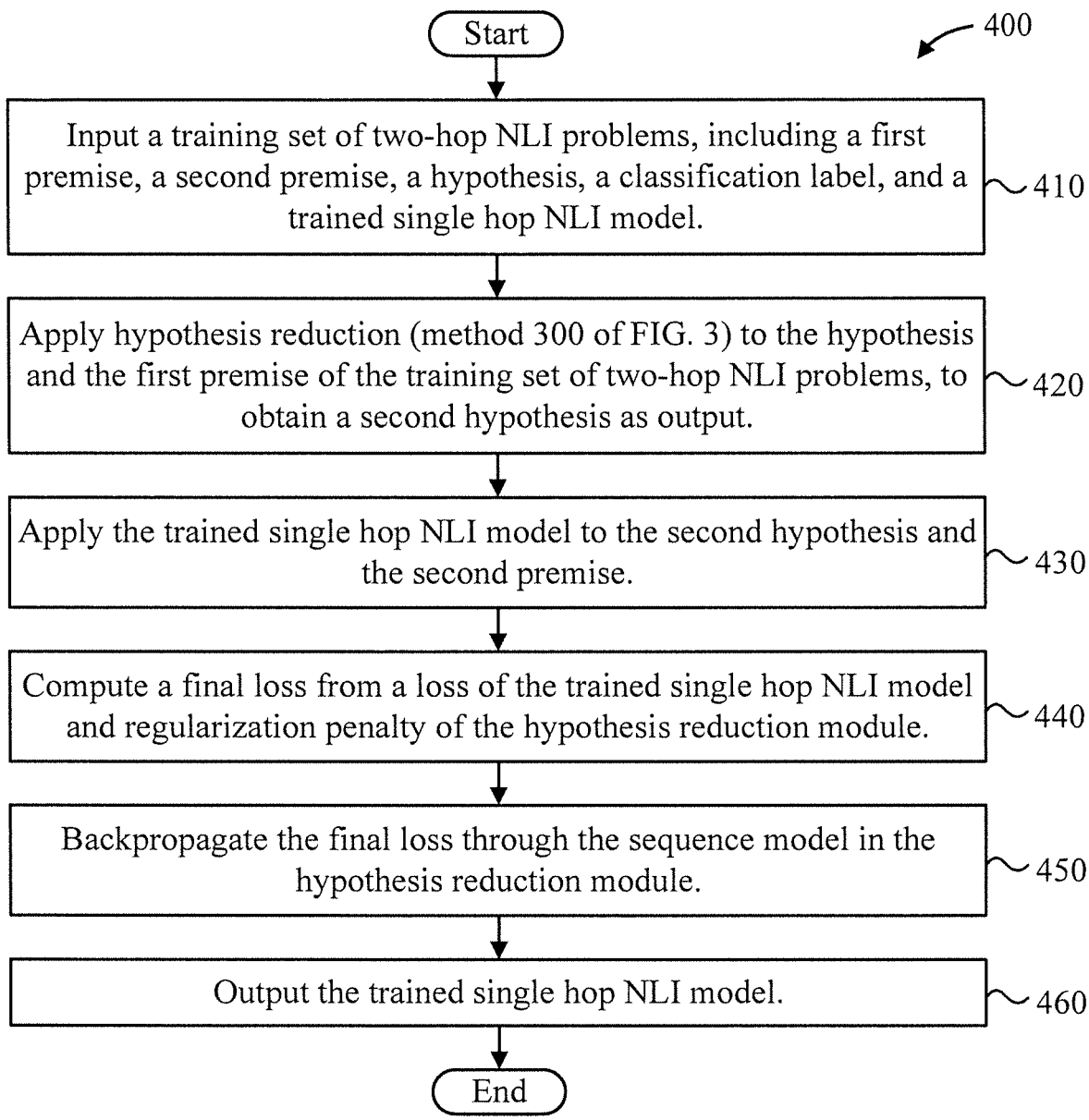
FIG. 4 is a flow diagram showing an exemplary method for hypothesis reduction training, in accordance with an embodiment of the present invention.

FIG. 4 is a flow diagram showing an exemplary method 400 for hypothesis reduction training, in accordance with an embodiment of the present invention.

At block 410, input a training set of two-hop NLI problems, including a first premise, a second premise, a hypothesis, a classification label, and a trained single hop NLI model.

At block 420, apply hypothesis reduction (method 300 of FIG. 3) to the hypothesis and the first premise of the training set of two-hop NLI problems, to obtain a second hypothesis as output.

At block 430, apply the trained single hop NLI model to the second hypothesis and the second premise.

At block 440, compute a final loss from a loss of the trained single hop NLI model and regularization penalty of the hypothesis reduction module.

At block 450, backpropagate the final loss through the sequence model in the hypothesis reduction module.

At block 460, output the trained single hop NLI model.

A description will now be given regarding a multi-hop entailment model, in accordance with an embodiment of the present invention.

Figure 5:
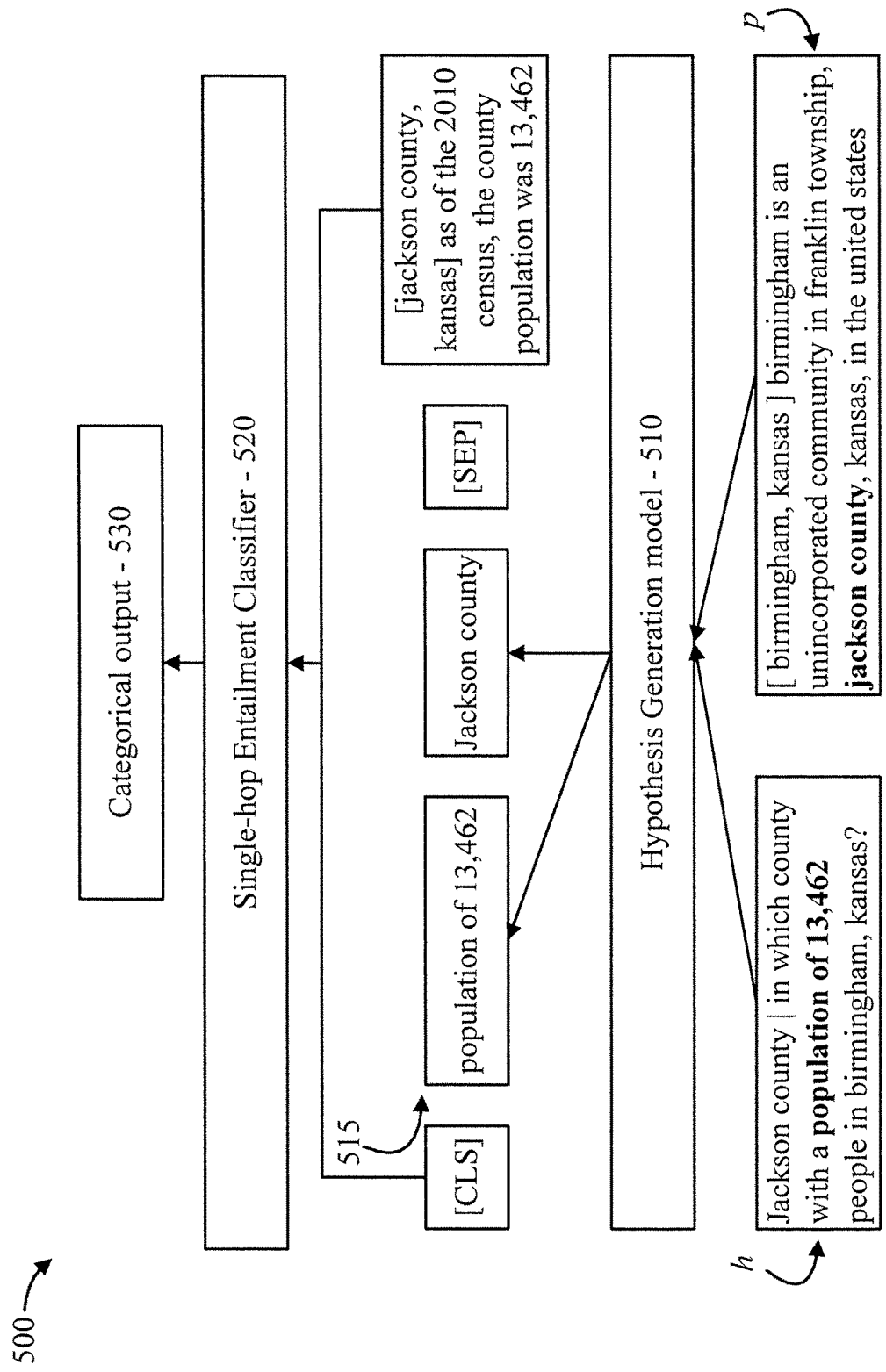
FIG. 5 is a block diagram showing an exemplary computing environment, in accordance with an embodiment of the present invention.

FIG. 5 is a block diagram showing an multi-hop entailment model (NLI model) 500, in accordance with an embodiment of the present invention.

In the first stage, the model selects "population of 13,462" from the hypothesis and "Jackson county" from the first premise to generate the intermediate hypothesis. In the second stage, the model verifies that the generated follow-up hypothesis is indeed supported by the second premise.

The multi-hop entailment model 500 is able to generate an intermediate interpretable hypothesis in an end-to-end training setup. Formally, the problem can be defined as follows: Given a hypothesis h, an optional premise p and an additional knowledge base K, the task is to determine the validity of h using information in K (and p if available) as entailment, neutral or contradiction (or as entailment or non-entailment). During training, access to ground truth sentence p' from K is assumed which is required to determine the relationship.

The model 500 includes a hypothesis generation model 510 followed by a single hop entailment model 520. The hypothesis generation model 510 fills a fixed number M of output slots 515 with words extracted from the hypothesis and the premise. The hypothesis generation model 510 extracts continuous span of words from the hypothesis and the premise separately while allowing them to be of variable length. The second part of the model 500 is the single hop entailment classifier 520, which takes in the newly generated hypothesis from previous stage along with a premise p' from K (which is available during training but needs to be retrieved from K during test time) to predict the categorical output 530.

The hypothesis generation module 510 may be implemented by any "sequence model" which outputs vectors for each token in a sequence. In one implementation, pre-trained Bidirectional Encoder Representations from Transformers (BERT) are used. First, pre-trained BERT is used to extract strong contextual representations of both the hypothesis and the premise. Then, a feed forward network is used on top of the representations to get two distributions as follows:

$$\{s_{h_i}^m\}_{i=1}^{l_h} \text{ and } \{s_{p_i}^m\}_{i=1}^{l_p} \text{ which denote} \tag{1}$$

$$s_{h_i}^m = P(hyp \text{ ends at } i \text{ and has length } m)$$

$$s_{p_i}^m = P(prem \text{ starts at } i \text{ and has length } m) \tag{2}$$

where $l_h$ and $l_p$ denote the length of the hypothesis and the premise, respectively.

These distributions are then used to softly extract phrases from the hypothesis and the premise as follows:

$$H_m = \Sigma_{i=1}^{l_h} \Sigma_{j=M-m+1}^{M} s_{h_i+M-m}^j x_{h_i} \tag{3}$$

where $H_m$ is the $m^{th}$ token in the phrase extracted from the hypothesis and $x_{h_i}$ is the representation of the $i^{th}$ token in the hypothesis. Similarly, the phrase extracted from the premise can be written as:

$$P_m = \Sigma_{i=1}^{l_p} \Sigma_{j=M}^{M} s_{p_i-m+1}^j x_{p_i} \tag{4}$$

where $P_m$ is the $m^{th}$ token in the phrase extracted from the premise. Note that $s_{h_i}^m$ and $s_{p_i}^m$ are zero when i and m are outside the permissible limits. The newly generated hypothesis is h'=[$H_1$; $H_2$; . . . ; $H_M$; $P_1$; $P_2$; . . . ; $P_M$] where the semicolon denotes the concatenation operation and M is the maximum length of the phrase extracted from both the hypothesis and the premise. Note that the model 500 can softly select variable length phrases from the hypothesis and premise by allowing the magnitude of weights to go to zero for the other slots. This is also the reason the probability is generated that the phrase ends at position i rather than starts, so that the "empty" slots (where weights can go to zero) are towards the outside in both phrases, and h' will not have any gaps between the phrases extracted from the hypothesis and the premise.

This follow-up hypothesis h' is then used along with the remaining premise p' from K (which is available during training and needs to be retrieved from K during test time) as input to the single hop entailment model 520. In one implementation, the single hop entailment model 520 constructs a contextual representation of the pair of sentences using Bidirectional Encoder Representations from Transformers (BERT). A simple softmax classifier is then used on top of these representations to generate the categorical output.

A description will now be given regarding regularization, in accordance with an embodiment of the present invention.

The model as above was observed to select multiple tokens in a single slot rather than take advantage of the multiple output slots which are available. To encourage the model to make use of the multiple output slots to extract a continuous phrase, a new regularization term is introduced which discourages the model from selecting overlapping spans. Specifically, if $A_{h_i}^m$ represents the weight of the token $x_{h_i}$ in output slot m for the hypothesis and $A_{p_i}^m$ represents the weight of the token $x_{p_i}$ in output slot m for the premise, then the regularization terms are given by:

$$L_{reg_h} = \Sigma_i \Sigma_m A_{h_i}^m \Sigma_{k=i+}^{i+m-1} A_{h_k}^m \tag{5}$$

$$L_{reg_p} = \Sigma_i \Sigma_m A_{p_i}^m \Sigma_{k=i-m+1}^{i-1} A_{p_k}^m \tag{6}$$

where $A_{h_i}^m$ and $A_{p_i}^m$ are zero when i and m are outside permissible limits. The final loss is as follows where α is a tuned hyperparameter:

$$L_{final} = L_{classification} + \alpha(L_{reg_h} + L_{reg_p}) \tag{7}$$

Figure 6:
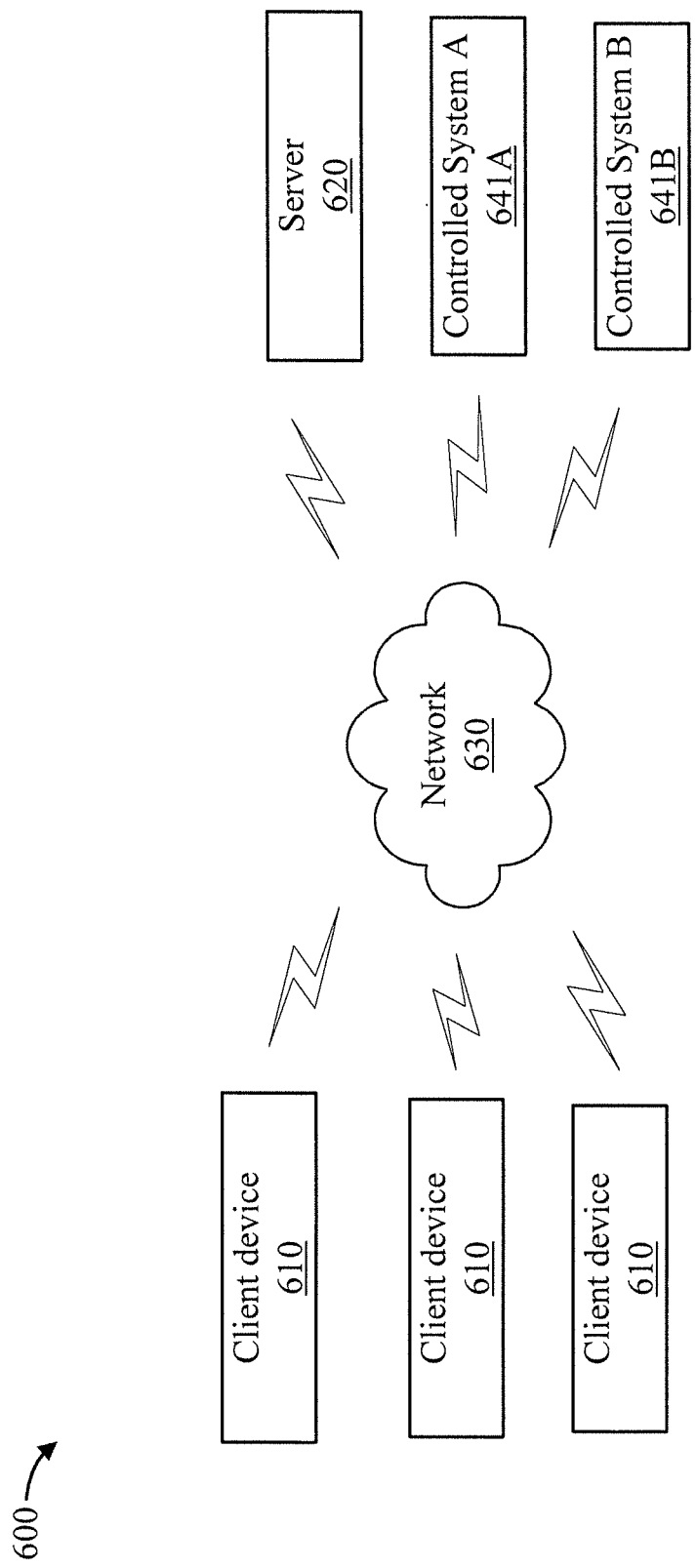
FIG. 6 is a block diagram showing an exemplary educational environment to which the present invention can be applied, in accordance with an embodiment of the present invention.

FIG. 6 is a block diagram showing an exemplary computing environment 500, in accordance with an embodiment of the present invention.

The environment 600 includes a server 610, multiple client devices (collectively denoted by the figure reference numeral 620), a controlled system A 641, a controlled system B 642.

Communication between the entities of environment 600 can be performed over one or more networks 630. For the sake of illustration, a wireless network 630 is shown. In other embodiments, any of wired, wireless, and/or a combination thereof can be used to facilitate communication between the entities.

The server 610 receives premises and hypotheses from client devices 620. The server 610 may control one of the systems 641 and/or 642 based on a hypothesis generated from a trained Natural Language Inference (NLI) model stored on the server 610. In an embodiment, premises and hypotheses may relate to the status of various machinery in a power plant or other facility.

Control can relate to turning an impending failing element off, swapping out a failed component for another operating component, switching to a secure network, and so forth based on an output second hypothesis provided as an explanation.

Figure 7:
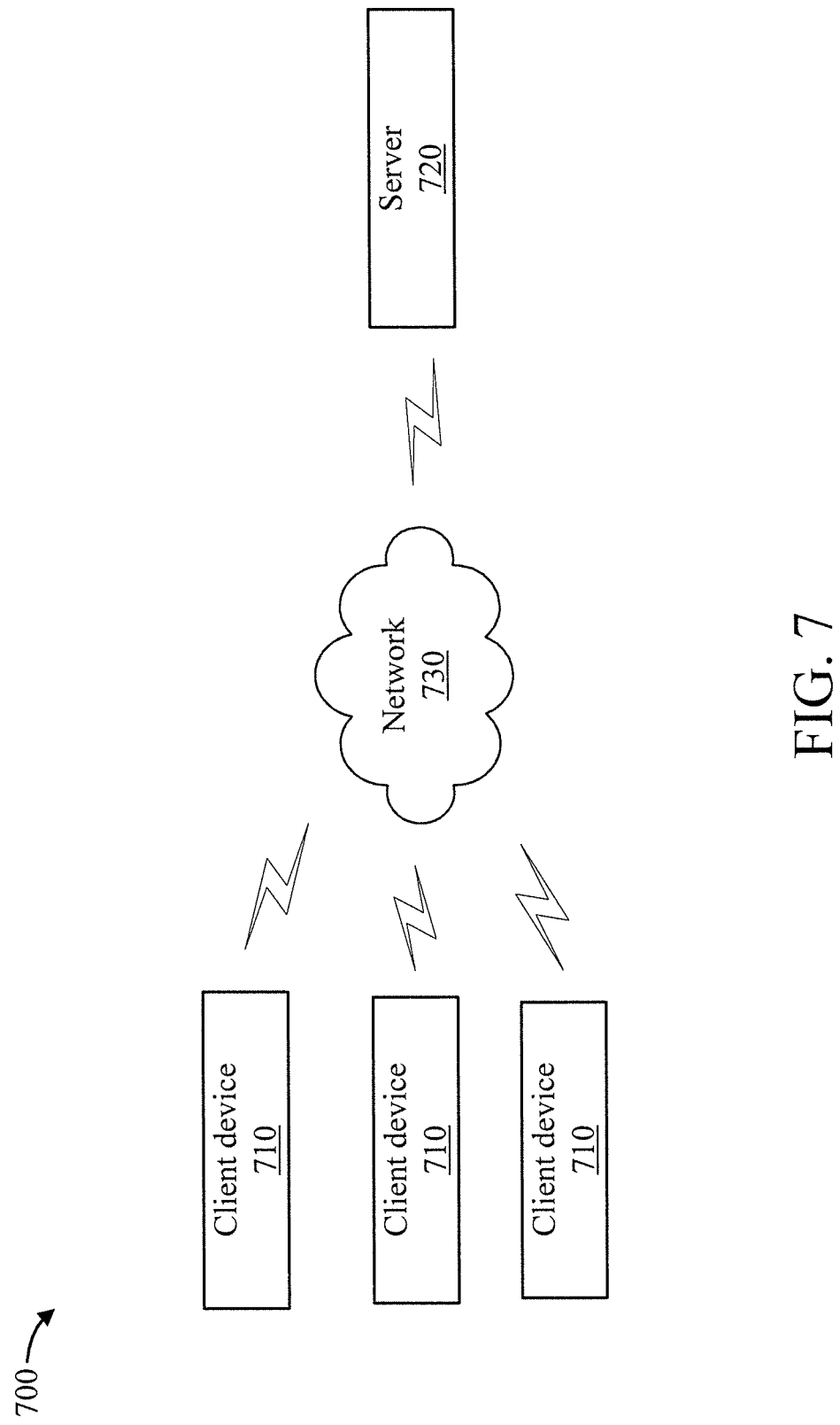
FIG. 7 is a block diagram showing another exemplary educational environment to which the present invention can be applied, in accordance with an embodiment of the present invention.

FIG. 7 is a block diagram showing an exemplary educational environment 700 to which the present invention can be applied, in accordance with an embodiment of the present invention.

The environment includes a set of client computers 710 and a server 720. The client computers 710 can be any of smart phones, tablets, laptops, desktops, and so forth.

Communication between the entities of environment 700 can be performed over one or more networks 730. For the sake of illustration, a wireless network 730 is shown. In other embodiments, any of wired, wireless, and/or a combination thereof can be used to facilitate communication between the entities.

The client computers 710 submit premises and hypotheses for hypothesis reduction and/or for obtaining explanations from the hypotheses and supporting or non-supporting ones of the premises. In this way, a student can be provided with an explanation with respect to a given subject matter relating to an initial hypothesis and supporting or non-supporting premises to obtain a second hypothesis as an explanation.

A description will now be given regarding the dataset used for various embodiments of the present invention, in accordance with an embodiment of the present invention.

HotpotQA is a recently created multi-hop reading comprehension dataset. Examples in this dataset include questions and answers, as well as contexts consisting of excerpts of Wikipedia articles, some of which are helpful in answering the question. The titles of the excerpted Wikipedia articles are given. In this dataset, the exact evidence sentences required to answer the question from within the context are also annotated. This multi-hop question answering dataset can be transformed into an entailment problem which requires multi-hop reasoning as follows: The question along with the answer can be considered as the hypothesis, whereas the premise is the evidence sentence which includes the answer. In such a setup, any entailment model will not be able to determine the inferential relationship accurately by just having access to the hypothesis and the premise. Instead, the model should be able to find the second evidence sentence (p' as described above) from the context (K as described above).

The above procedure can be directly used to create entailment examples. To create non-entailment examples, the following four strategies are used to create the second premise p' whenever possible:

1. Randomly select a sentence which has the same title as p.
2. Replace all the named entities in correct p' with a randomly selected named entity from HotpotQA which has the same type.
3. Select a sentence which has the same title as correct p' and replace a named entity by the title of the p if they have the same type.
4. Select the sentence which has the shortest TF-IDF distance to h+p where '+' denotes concatenation.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for extracting explanations, comprising:
    learning hypothesis reduction by training a feed forward network model on two-hop Natural Language Inference (NLI) problems that include a first premise, a second premise, and a hypothesis;

generating, by the trained feed forward network model using hypothesis reduction, an explanation in a form of a selection of words from an input premise and an input hypothesis, for an input single hop NLI problem to determine a connection status of a connected computer system that includes the input premise and the input hypothesis;

controlling a hardware switch to transfer connection to a secure network within the connected computer system based on the explanation;

wherein said learning step comprises:

determining, using the feed forward network model, a distribution over extraction starting positions and extraction lengths from within the first premise and the hypothesis of a two-hop NLI problem from among the two-hop NLI problems;

filling, responsive to the distribution, a first k extraction output slots with combinations of words from the first premise of the two-hop NLI problem;

filling, responsive to the distribution, a second k extraction output slots with combinations of words from the hypothesis of the two-hop NLI problem;

training the feed forward network model by using the first k extraction output slots and the second k extraction output slots together with the second premise as an input to a single-hop NLI classifier to output a label of the two-hop NLI problem by:

applying hypothesis reduction to a hypothesis and a first premise from a training set of two-hop NLI problem to obtain a second hypothesis;

applying the trained single hop NLI classifier to the second premise and the second hypothesis;

computing a final loss from a trained single hope NLI classifier and regularization penalty of a hypothesis reduction module of the feed forward network model; and backpropagating the final loss through the feed forward network model.

2. The computer-implemented method of claim 1, where a regularization penalty is added to discourage the separate extractions of overlapping spans of words from among the combinations of words from the first premise and the hypothesis of the two-hop NLI problem.

3. The computer-implemented method of claim 1, wherein a final loss is specified by a sum of a classification loss and a term formed by multiplying a sum of a premise regularization loss and a hypothesis regularization loss by a tunable hyperparameter.

4. The computer-implemented method of claim 3, wherein the premise regularization loss and the hypothesis regularization loss are sums of products of weights in the k extraction output slots and the second k extraction output slots.

5. The computer-implemented method of claim 1, wherein said generating step selects words by taking the words with a largest contribution to each of the extraction output slots.

6. The computer-implemented method of claim 1, wherein said generating step selects words whose contribution to each of the extraction output slots exceeds a threshold.

7. The computer-implemented method of claim 1, where weights of the single hop NLI classifier are not updated as the feed forward network model is trained.

8. The computer-implemented method of claim 1, wherein two-hop NLI problems with an entailment label are constructed from two-hop question answering problems by taking a question and the answer to the question to form the input hypothesis, taking the first premise to be an evidence sentence that includes the answer, and taking the second premise to be the evidence sentence that does not include the answer.

9. The computer-implemented method of claim 1, wherein two-hop NLI problems with a non-entailment label are constructed from two-hop question answering problems by taking a question and the answer to the question to form the input hypothesis, taking the first premise to be an evidence sentence that includes the answer, and selecting a non-evidence sentence from an article with the same title as the first premise to be the second premise.

10. The computer-implemented method of claim 1, wherein two-hop NLI problems with a non-entailment label are constructed from two-hop question answering problems by taking a question and the answer to the question to form the input hypothesis, taking the first premise to be an evidence sentence that includes the answer, and taking the second premise to be an evidence sentence that does not include the answer, modified by replacing its named entities by randomly chosen named entities of a same type.

11. A computer program product for extracting explanations, the computer program product comprising a non-transitory computer readable storage medium having program instructions embodied therewith, the program instructions executable by a computer to cause the computer to perform a method comprising:

learning hypothesis reduction by training an feed forward network model on two-hop Natural Language Inference (NLI) problems that include a first premise, a second premise, and a hypothesis;

generating, by the trained feed forward network model using hypothesis reduction, an explanation in a form of a selection of words from an input premise and an input hypothesis, for an input single hop NLI problem to determine a connection status of a connected computer system that includes the input premise and the input hypothesis;

controlling a hardware switch to transfer connection to a secure network within the connected computer system based on the explanation;

wherein said learning step comprises:

determining, using the feed forward network model, a distribution over extraction starting positions and extraction lengths from within the first premise and the hypothesis of a two-hop NLI problem from among the two-hop NLI problems;

filling, responsive to the distribution, a first k extraction output slots with combinations of words from the first premise of the two-hop NLI problem;

filling, responsive to the distribution, a second k extraction output slots with combinations of words from the hypothesis of the two-hop NLI problem;

training the feed forward network model by using the first k extraction output slots and the second k extraction output slots together with the second premise as an input to a single-hop NLI classifier to output a label of the two-hop NLI problem by:

applying hypothesis reduction to a hypothesis and a first premise from a training set of two-hop NLI problem to obtain a second hypothesis;

applying the trained single hop NLI classifier to the second premise and the second hypothesis;

computing a final loss from a trained single hope NLI classifier and regularization penalty of a hypothesis reduction module of the feed forward network model; and backpropagating the final loss through the feed forward network model.

12. The computer program product of claim 11, where a regularization penalty is added to discourage the separate extractions of overlapping spans of words from among the combinations of words from the first premise and the hypothesis of the two-hop NLI problem.

13. The computer program product of claim 11, wherein a final loss is specified by a sum of a classification loss and a term formed by multiplying a sum of a premise regularization loss and a hypothesis regularization loss by a tunable hyperparameter.

14. The computer program product of claim 13, wherein the premise regularization loss and the hypothesis regularization loss are sums of products of weights in the k extraction output slots and the second k extraction output slots.

15. The computer program product of claim 11, wherein said generating step selects words by taking the words with a largest contribution to each of the extraction output slots.

16. The computer program product of claim 11, wherein said generating step selects words whose contribution to each of the extraction output slots exceeds a threshold.

17. The computer program product of claim 11, where weights of the single hop NLI classifier are not updated as the feed forward network model is trained.

18. The computer program product of claim 11, wherein two-hop NLI problems with an entailment label are constructed from two-hop question answering problems by taking a question and the answer to the question to form the input hypothesis, taking the first premise to be an evidence sentence that includes the answer, and taking the second premise to be the evidence sentence that does not include the answer.

19. A computer-implemented method for extracting explanations, comprising:

a memory device for storing program code; and a processor device, operatively coupled to the memory device, for running the program code to learn hypothesis reduction by training a feed forward network model on two-hop Natural Language Inference (NLI) problems that include a first premise, a second premise, and a hypothesis;

generate, by the trained feed forward network model using hypothesis reduction, an explanation in a form of a selection of words from an input premise and an input hypothesis, for an input single hop NLI problem to determine a connection status of a connected computer system that includes the input premise and the input hypothesis;

control a hardware switch to transfer connection to a secure network within the connected computer system based on the explanation;

wherein the processor device learns the hypothesis reduction by determining, using the feed forward network model, a distribution over extraction starting positions and extraction lengths from within the first premise and the hypothesis of a two-hop NLI problem from among the two-hop NLI problems;

filling, responsive to the distribution, a first k extraction output slots with combinations of words from the first premise of the two-hop NLI problem;

filling, responsive to the distribution, a second k extraction output slots with combinations of words from the hypothesis of the two-hop NLI problem;

training the feed forward network model by using the first k extraction output slots and the second k extraction output slots together with the second premise as an input to a single-hop NLI classifier to output a label of the two-hop NLI problem by:

applying hypothesis reduction to a hypothesis and a first premise from a training set of two-hop NLI problem to obtain a second hypothesis;

applying the trained single hop NLI classifier to the second premise and the second hypothesis;

computing a final loss from a trained single hope NLI classifier and regularization penalty of a hypothesis reduction module of the feed forward network model; and backpropagating the final loss through the feed forward network model.

* * * * *